(12) United States Patent
Chen

(10) Patent No.: US 7,327,254 B2
(45) Date of Patent: Feb. 5, 2008

(54) BULB WITH SENSING FUNCTION

(76) Inventor: Kai-Po Chen, PO BOX 82-144, Taipei (TW)

( * ) Notice: Subject to any disclaimer, the term of this patent is extended or adjusted under 35 U.S.C. 154(b) by 144 days.

(21) Appl. No.: 11/047,632

(22) Filed: Feb. 2, 2005

(65) Prior Publication Data

US 2006/0181416 A1 Aug. 17, 2006

(51) Int. Cl.
*G08B 13/08* (2006.01)
*F21L 4/00* (2006.01)

(52) U.S. Cl. ............. 340/545.2; 340/565; 340/566; 340/321; 362/186; 362/249; 362/252; 362/347; 362/800

(58) Field of Classification Search ............ None
See application file for complete search history.

(56) References Cited

U.S. PATENT DOCUMENTS

2006/0078460 A1* 4/2006 Ryu et al. ............... 422/5

\* cited by examiner

*Primary Examiner*—Julie Bichngoc Lieu
(74) *Attorney, Agent, or Firm*—Leong C. Lei

(57) ABSTRACT

A bulb adapted with an infrared sensor includes a LED and a power switch, the switch being turned on to light the LED in the bulb when the sensor detects the heat emitted from a human body and turned off to kill the light when failing to detect the heat for practical use and energy saving purposes.

1 Claim, 7 Drawing Sheets

BULB WITH SENSING FUNCTION

BACKGROUND OF THE INVENTION (a) Technical Field of the Invention

The present invention is related to a bulb with sensing function, and more particularly to one adapted with an infrared sensor to control on and off of the bulb for energy saving purpose.

(b) Description of the Prior Art

Advanced technology and discoveries of the principles of infrared help the development of more and more infrared-based products. When a bulb is adapted with an infrared sensor to detect the heat radiation, it achieves the practical and energy saving purpose. The bulb adapted with infrared sensor has been very popular in an age of surging awareness of environmental protection.

The bulb with sensing function of the prior art has an infrared sensor as the power switch of the light source of the bulb. When anyone enters into the range of the sensor, the sensor detects the heat emitted from the human body and turns on the bulb. When that person is out of the sensing range or motionless, the sensor controls the internal circuit to cut off the power supply to the bulb for saving energy. However, the bulb itself generates heat when turned on to confuse the infrared sensor. Therefore, the sensor and the bulb must be separately provided as taught in Publication No. 271806 (Taiwan Gazette) of a patent application titled "Burglarproof and Easy Assembly Lamp Holder". Nonetheless, the separation of the bulb and the sensor prevents the installation of a shade to the bulb since the shade would block the detection of the movement outside the shade to compromise the working range of the sensor.

SUMMARY OF THE INVENTION

The primary purpose of the present invention is to provide an improved construction of a bulb adapted with an infrared sensor by having installed the infrared sensor inside the bulb with a certain part of the sensor protruding out of the shell of the bulb. An LED is used instead of a conventional bulb so to eliminate the problem that the heating bulb affects the sensitivity of the sensor. LED is known for lower power consumption and longer service life to significantly promote the light quality of the present invention while permitting easy installation simply by placing the LED bulb of the present invention on the existing bulb base. Furthermore, the use of the shade will not affect the sensing function of the sensor.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
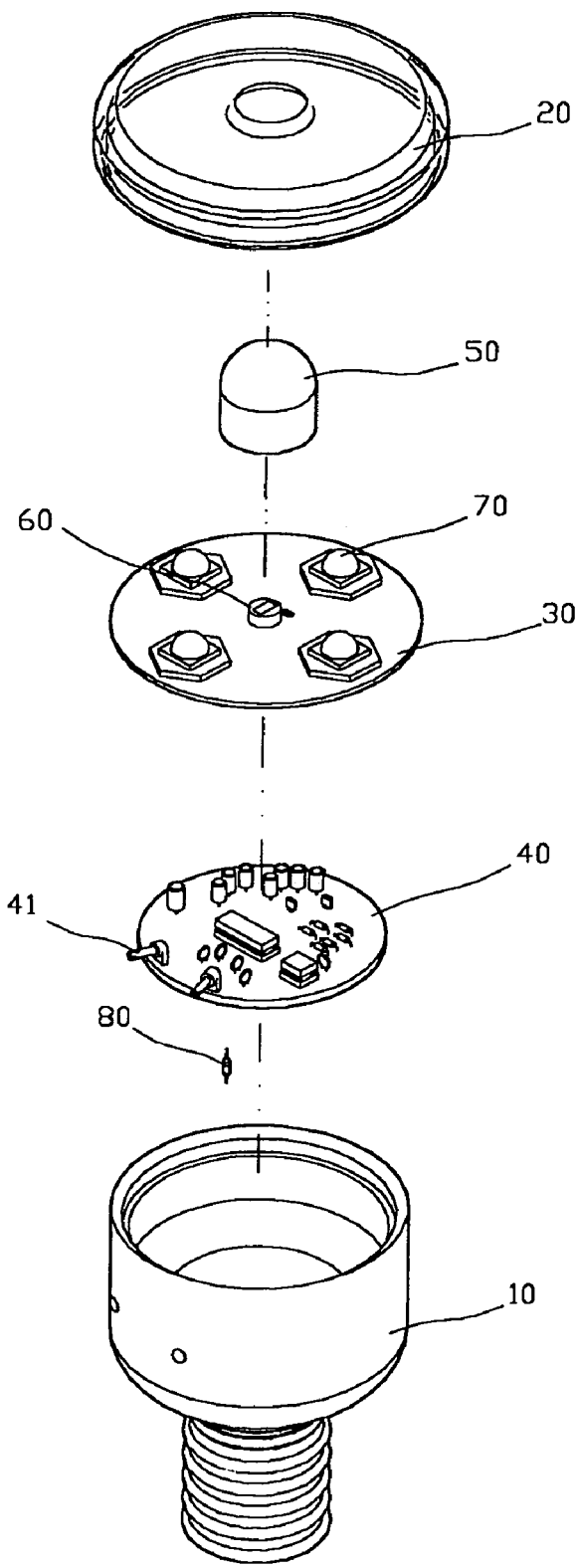
FIG. 1 is an exploded view of a preferred embodiment of the present invention.
Figure 2:
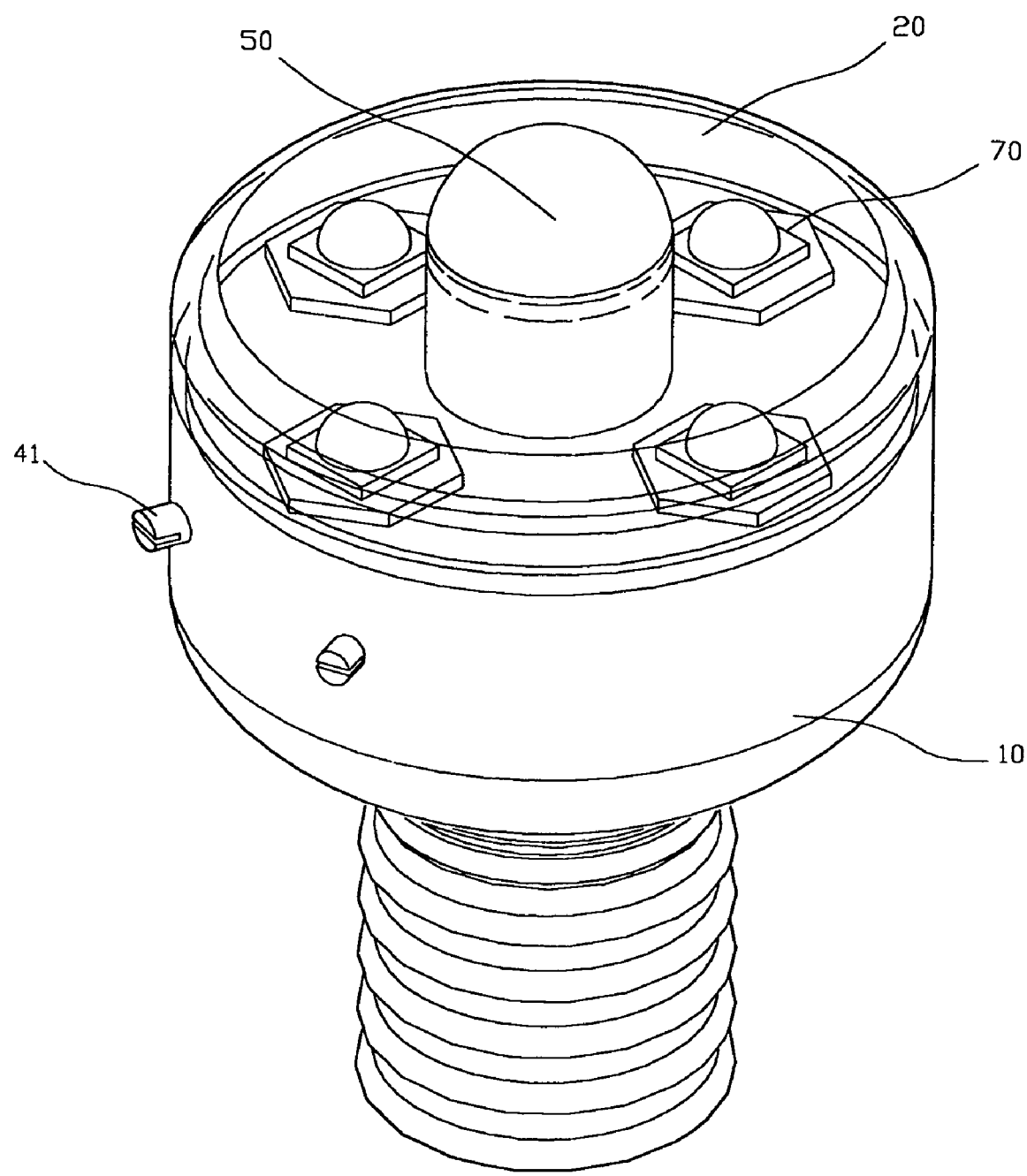
FIG. 2 is a perspective view of the preferred embodiment of the present invention.
Figure 3:
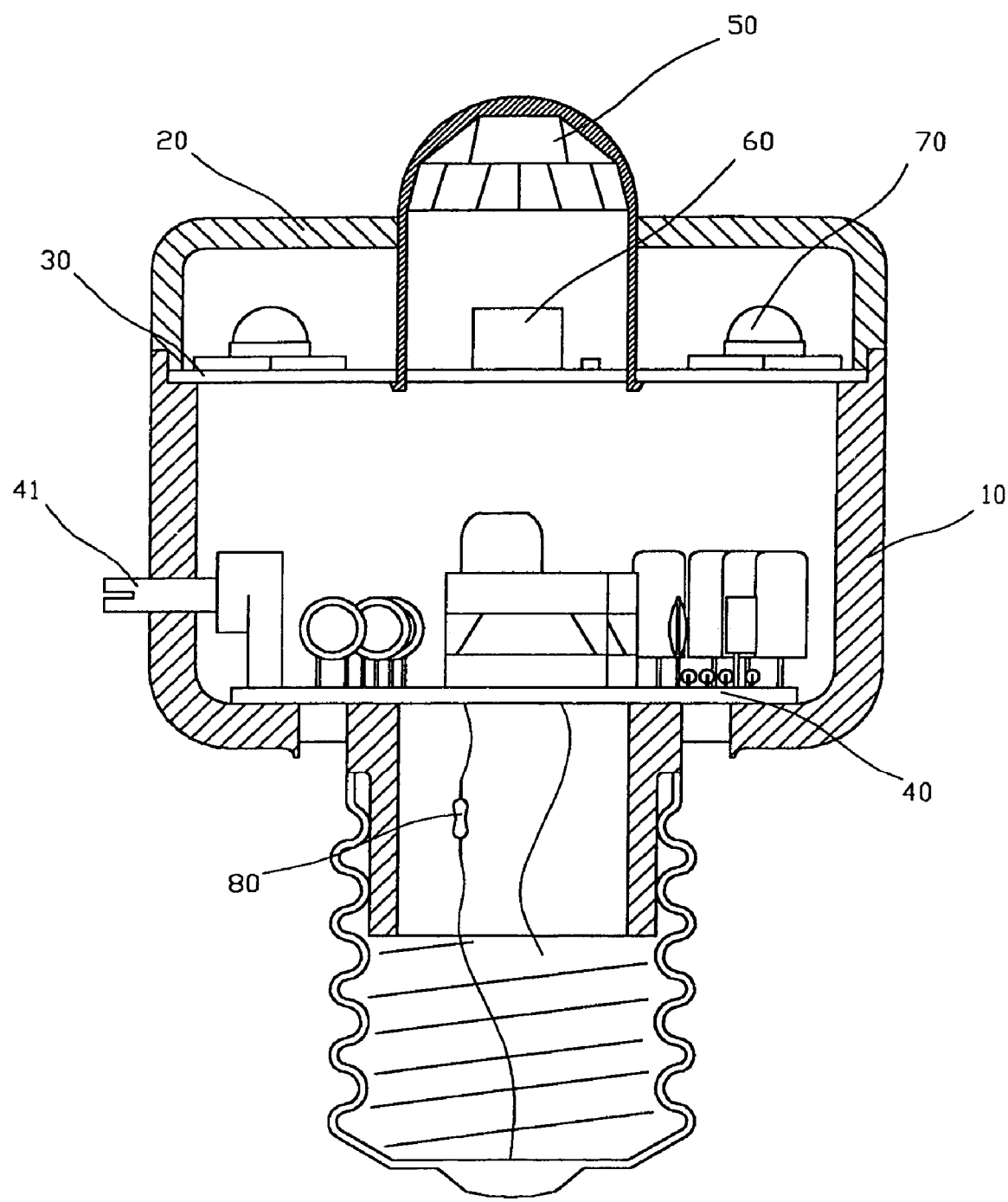
FIG. 3 is a sectional view of the preferred embodiment of the present invention.

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1 through 5, the present invention is essentially comprised of a base 10, a lampshade 20, a circuit board 30, a control panel 40, a condensing shade 50, an infrared sensor 60, and multiple high-power light emitting diodes (LEDs) 70.

Both of the infrared sensor 60 and those high-power LEDs 70 are mounted to the circuit board A30 with the sensor 60 secured at the center of the circuit board 30 and those LEDs 70 arranged on the circumference of the circuit board 30. The circuit board A is mounted to the base 10 and the lamp shade 20 made see-through material covers up the base 10. The condensing shade 50 covers the sensor 60 and extends upwardly through a center of the lampshade 20. An electronic device on the control panel 40 receives signals transmitted form the sensor 60 to control the operation of the LEDs 70. The time to go off of the LEDs 70 is controlled by regulating a variable resistor 41 disposed on the control panel 40. A resistor 80 is connected from the control panel 40 to a metal part at the bottom of the base 10 to regulate the power transmission.

Figure 4:
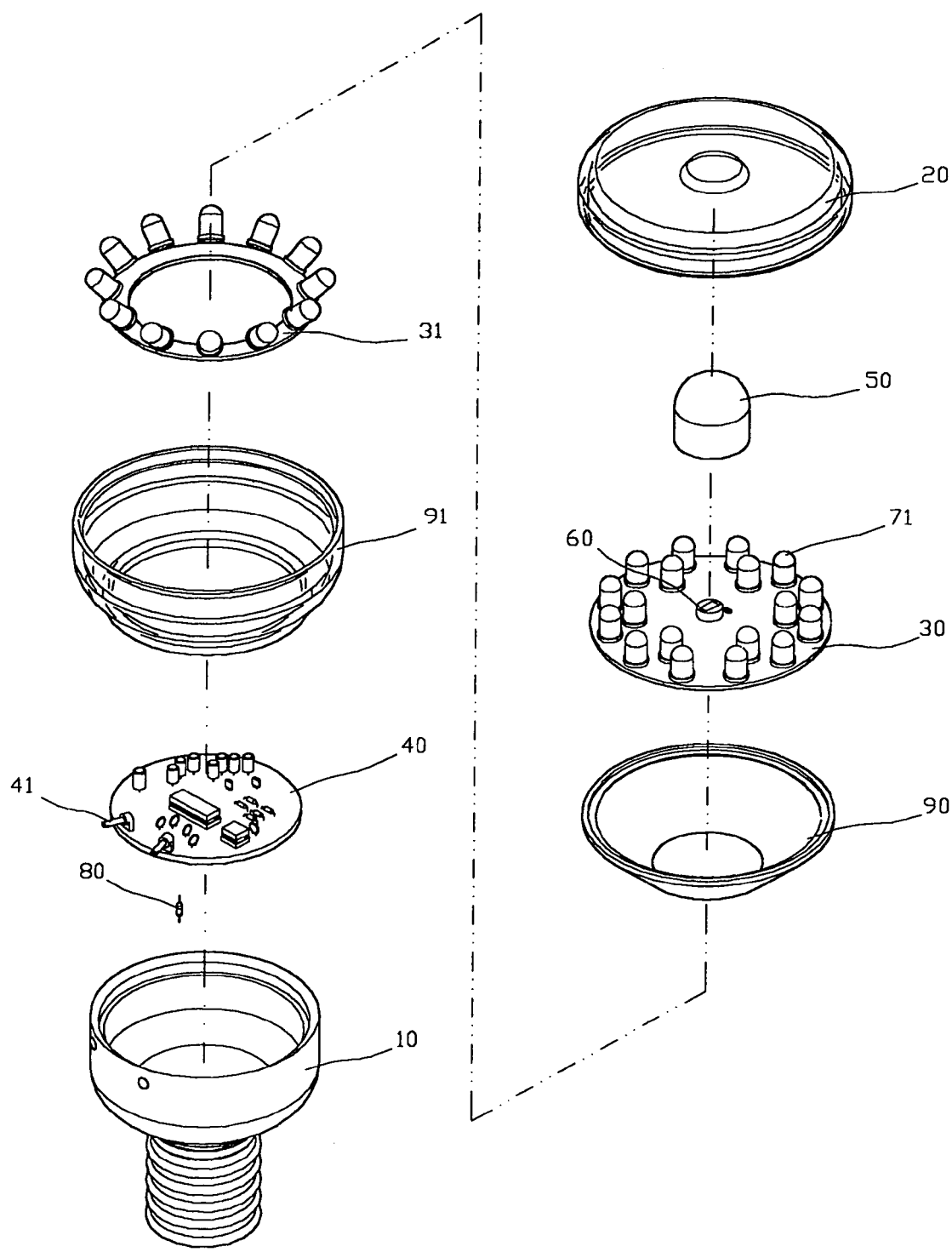
FIG. 4 is an exploded view of another preferred embodiment of the present invention.
Figure 5:
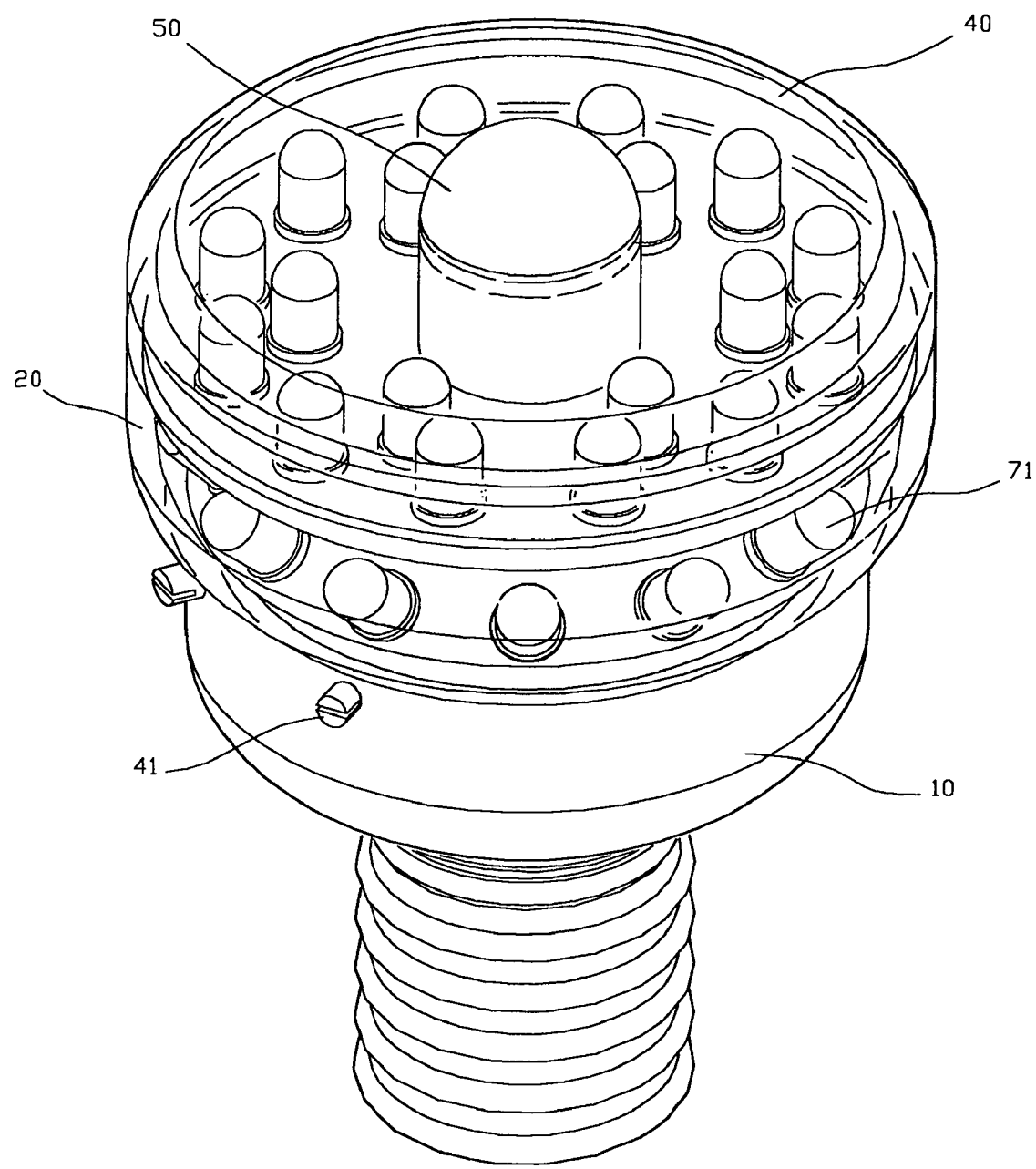
FIG. 5 is a perspective view of another preferred embodiment of the present invention.
Figure 6:
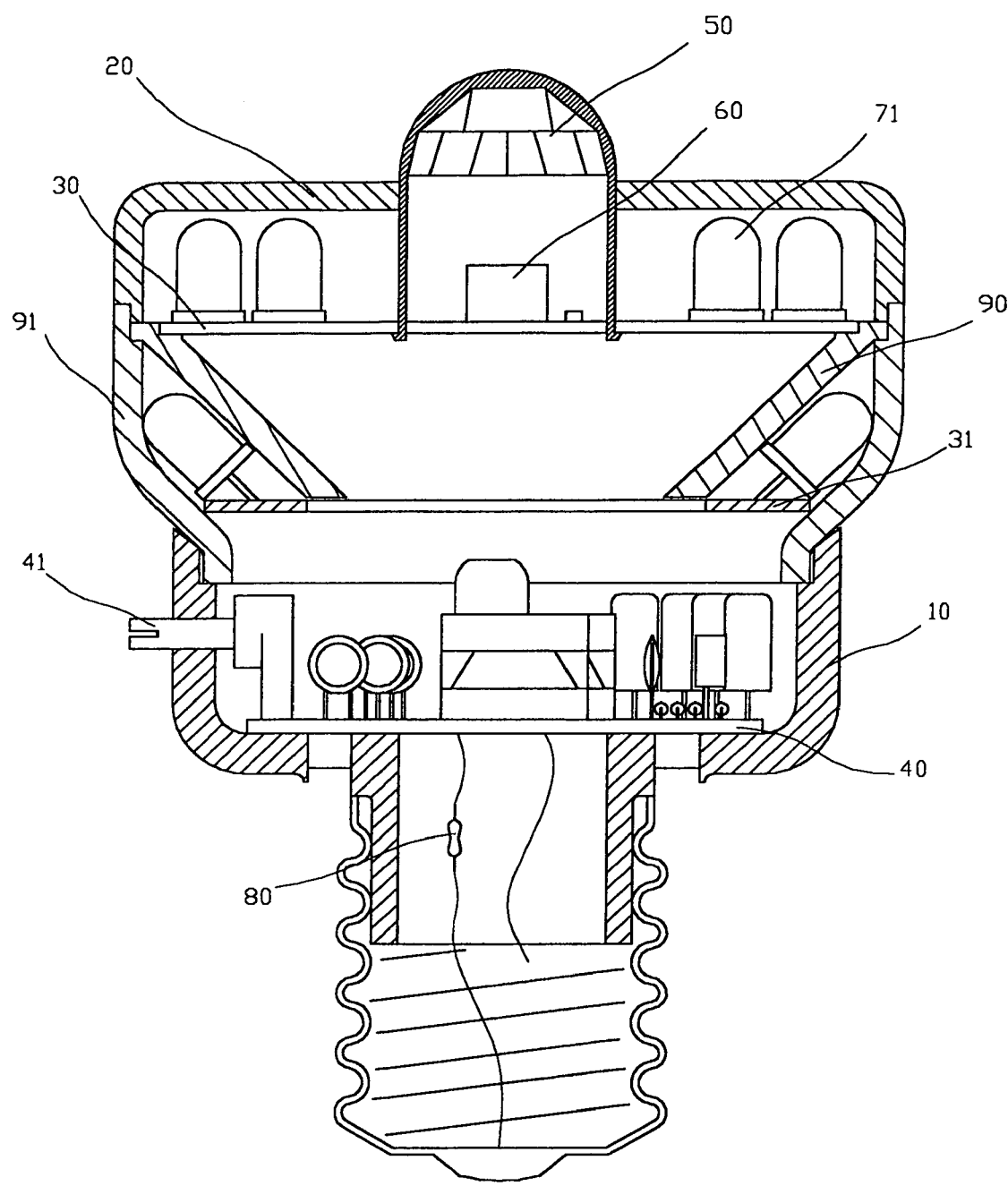
FIG. 6 is a sectional view of another preferred embodiment of the present invention.
Figure 7:
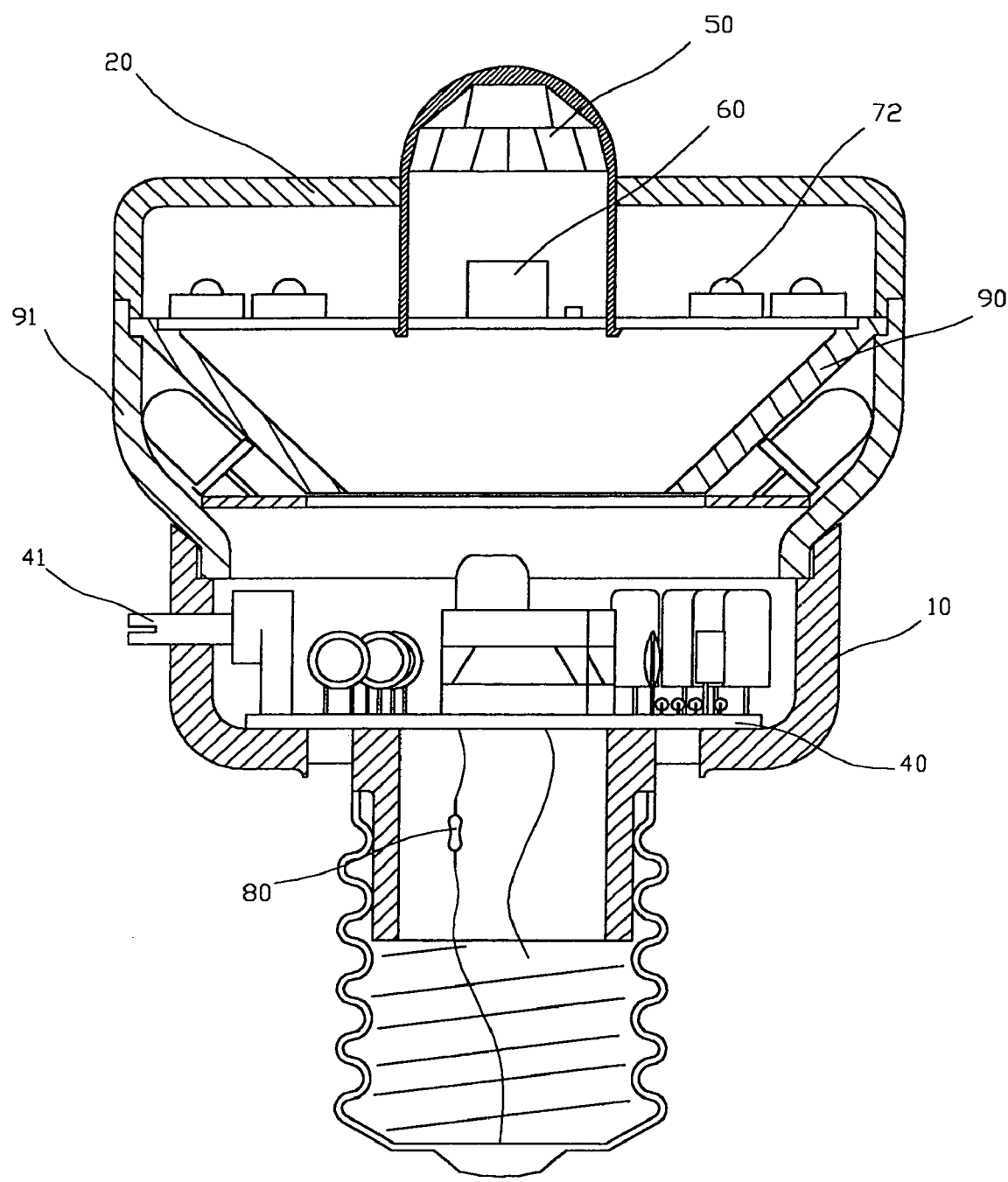
FIG. 7 is a sectional view of another preferred embodiment yet of the present invention.

To provide more light projection sources and expend the light emitting coverage, an additional circuit board B31 is provided as illustrated in FIG. 4 with multiple general LEDs 71 or ultra flux LED lamps 72 arranged on the circumference of the circuit board B31 at a certain inclination to increase the projection area in conjunction of a funnel shaped reflection hood 90 and a base plate 91.

Whereas the general infrared sensor 60 works by detecting the heat radiation from a human body, the sensitivity of the sensor 60 is affected by the heat generated from a conventional tungsten lamp. In the present invention, instead of a tungsten lamp, the LED 70, is used to take advantage of its feature of maintaining constant temperature while being lighted without separating the LED 70 and the sensor 60. A through hole is provided at the center of the lampshade 20 for the detection range of the sensor 60 to maintain effective coverage to its maximum. The through hole permits the front end of the condensing shade 50 to stay out of the lampshade 20 while the sensor 60 is paid effective sensing range due to the web tangent at the top of the inside the condensing shade 50.

The present invention provides the following advantages:
1. Lower cost and easier installation allow direction installation to a general bulb base or built-in bulb base, and use in conjunction with a lampshade.
2. LED lamps are used for saving power consumption, providing longer service life and maintaining at a constant temperature without affecting the sensitivity of the sensor.
3. The LEDs are turned on as long as the sensor picks up the presence of a human body to achieve the purpose of energy saving.
4. Wide light projection coverage close to that offered by the conventional bulb.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:
1. A bulb comprising:
a base;
a control panel mounted within said base;
a resistor connected between said control panel and a metal part of a bottom of said base to regulate power transmission;
a base plate mounted on said base and arranged above said control panel;
a first circuit board mounted within said base plate and provided with a plurality of light emitting diodes arranged on a circumference of said first circuit board at an inclination;
a funnel shaped refection hood mounted on said first circuit board;
a second circuit board mounted on said funnel shaped reflection hood, said second circuit board having a plurality of light emitting diodes mounted on a circumference of said second circuit board and an infrared sensor mounted on a center of said second circuit board;
said control panel having an electronic means for receiving signals from said infrared sensor to control said light emitting diodes, said control panel having a variable resistor for time for said light emitting diodes to go off;
a condensing shade covering said infrared sensor; and
a lampshade made of see-through material and covering said second circuit board and engaged with an upper edge of said base plate, said lampshade having an opening through which extends said condensing shade.

* * * * *